(12) United States Patent
Taira et al.

(10) Patent No.: US 6,419,401 B1
(45) Date of Patent: Jul. 16, 2002

(54) OPTICAL CONNECTOR FERRULE

(75) Inventors: Junji Taira; Masahiro Nakajima; Kouji Minami; Hiroyuki Tokita; Tatsuo Koshigoe, all of Tokyo; Nobuo Suzuki, deceased, late of Tokyo, all of (JP), by Sayoko Suzuki, executor

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/214,693
(22) PCT Filed: Jul. 9, 1997
(86) PCT No.: PCT/JP97/02372
§ 371 (c)(1),
(2), (4) Date: Apr. 23, 1999
(87) PCT Pub. No.: WO98/01782
PCT Pub. Date: Jan. 15, 1998

(30) Foreign Application Priority Data

Jul. 9, 1996 (JP) .............................................. 8-179532

(51) Int. Cl.[7] .................................................. G02B 6/38
(52) U.S. Cl. .............................. 385/60; 385/55; 385/66; 385/72; 385/78
(58) Field of Search ............................ 385/60, 66, 68, 385/67, 72, 78, 84, 85, 55, 58

(56) References Cited

U.S. PATENT DOCUMENTS

| 4,361,380 A | * | 11/1982 | Marazzi | 385/55 |
| 4,440,471 A | * | 4/1984 | Knowles | 350/96.2 |
| 4,636,034 A | * | 1/1987 | Kashimura et al. | 385/55 |
| 5,016,970 A | * | 5/1991 | Nagase et al. | 385/55 |
| 5,598,496 A | * | 1/1997 | Anderson et al. | 385/84 |
| 5,675,680 A | * | 10/1997 | Ames et al. | 385/54 |
| 5,940,561 A | * | 8/1999 | Dean, Jr. et al. | 385/60 |

FOREIGN PATENT DOCUMENTS

| JP | 60164712 | 8/1985 |
| JP | 4-130907 | * 12/1992 |
| JP | 10039167 | 2/1998 |

OTHER PUBLICATIONS

Patent Abstracts of Japan, vol. 010, No. 220 (p–482) Jul. 31, 1986.*
Patent Abstracts of Japan, vol. 009, No. 048 (p–338) Feb. 28, 1985.*
Patent Abstracts of Japan, vol. 010, No. 354 (p–521) Nov. 28, 1986.*
Patent Abstracts of Japan, vol. 010, No. 007 (p–419) Jan. 11, 1986.

* cited by examiner

Primary Examiner—Hemang Sanghavi
(74) Attorney, Agent, or Firm—Adams & Wilks

(57) ABSTRACT

A ferrule for use in an optical connector enabling effective suppression of the increase in the insertion loss resulting from repeated attachments/detachments of the optical connector. In the ferrule for use in the optical connector, a plurality of grooves 17 are formed in a fitting surface 16A of a ferrule main body 11 located between the ferrule main body 11 and a connection sleeve SL. And, a ferrule 2 for use in an optical connector, a plurality of concentric annular grooves 27 are formed in a connection end surface 24 of the ferrule main body 21 having a connection end 22A of the optical fiber 22 exposed thereon.

14 Claims, 9 Drawing Sheets (A)  (B)

(A)   (B)

OPTICAL CONNECTOR FERRULE

TECHNICAL FIELD

The present invention relates to an improvement in a ferrule for use in an optical connector, used to connect optical fibers to each other or connect an optical fiber and light-receiving or -emitting element to each other.

BACKGROUND ART

Ordinarily, as illustrated in FIG. 8, a ferrule for use in an optical connector is constructed in such a way that an exposed forward end optical fiber 101A of an optical fiber cable 101 is fixed in an insertion hole 100A in the axial direction of a ferrule main body 100 shaped like a circular-columnar body by using an adhesive. As illustrated in FIG. 9, two ferrules for use in an optical connector each having this construction are axially aligned with and connected to each other by using a circular-cylindrical sleeve 103. That is, the two ferrules are inserted, by being slid, into the circular-cylindrical sleeve 103 axially formed with a split (not illustrated), whereby the mating ferrules are caused to oppose each other at a central portion of the sleeve and are connected to each other.

Accordingly, when mating ferrules for use in an optical connector are repeatedly attached and detached within the sleeve, waste generated due to the friction between the ferrule main body and the sleeve, dust suspended in the air, etc. attach onto an outer-peripheral surface 102 or forward end surface 103 of the ferrule main body. As a result, there arises the inconvenience that axial displacement occurs between the two ferrules to be connected together or waste enters between connection end surfaces of the two ferrules and as a result a clearance is produced therebetween to result in a defective contact between the two. As a consequence, as illustrated in FIG. 10, with the repeated attachment/detachments of the ferrules, the optical transmission loss made between the two increases. In consequence, for example, there is a problem in that the insertion loss tended to rapidly increase after a repeated approximately 100-time use of the optical connector.

Accordingly, an object of the present invention is to provide a ferrule for use in an optical connector enabling effective suppression of the increase in the insertion loss due to repeated attachments/detachments of the optical connector.

DISCLOSURE OF THE INVENTION

The present invention provides a ferrule for use in an optical connector, the ferrule comprising a main body of the ferrule fitted into a connection sleeve and having an optical fiber fixed therein, in which a plurality of grooves are formed in an outer-peripheral surface of the ferrule main body including a fitting surface thereof located between the ferrule main body and the connection sleeve. According to this construction, in cases where dust has attached for various reasons onto the fitting surface between the ferrule main body and the connection sleeve, when the ferrule for use in an optical connector is fitted into the connection sleeve, at the fitting time the dust on the fitting surface is caused to drop into the groove formed in the fitting surface. This makes it possible to maintain the fitting surface of the ferrule main body and the fitting inner-peripheral surface of the connection sleeve in a required fitted state.

Also, the present invention provides a ferrule for use in an optical connector, comprising a main body of the ferrule having formed therein an insertion hole having inserted and fixed therein an optical fiber, in which a plurality of concentric annular grooves are formed in a connection end surface of the ferrule main body having a connection end of the optical fiber exposed thereon. According to this construction, when the ferrule main body abuts within a connection sleeve on a connection end surface of the other ferrule, the dust having attached for various reasons onto the connection end surfaces is caused to drop into the annular grooves formed therein. This makes it possible to maintain the connection end surfaces of the two ferrules in a required contact state.

BEST MODES FOR CARRYING OUT THE INVENTION

Figure 1:
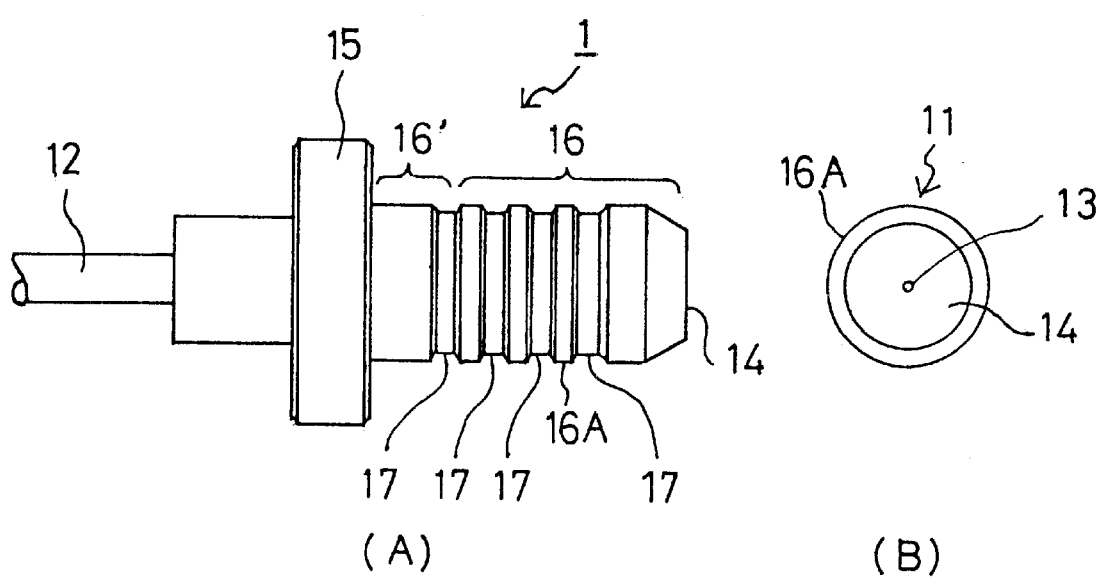
FIGS. 1(A) and 1(B) are a front view and right side view illustrating an example of an embodiment of a ferrule.

An example of an embodiment of the present invention will now be explained in detail with reference to the drawings.

FIGS. 1(A) and 1(B) illustrate an example of an embodiment of a ferrule for use in an optical connector according to the present invention, FIG. 1(A) being a front view thereof and FIG. 1(B) being a right side view thereof. A ferrule 1 for use in an optical connector has a circular-columnar ferrule main body 11 formed using metal material or ceramic material such as zirconia. The ferrule main body 11 has formed therein an insertion hole for permitting insertion therethrough of a buffered optical fiber 12 whose forward end buffer is partly removed to expose an optical fiber (not illustrated) thereof in such a way that the insertion hole passes through the ferrule main body 11 at the center axis thereof. The exposed optical fiber inserted in the insertion hole 13 provided at the end portion is fixed therein by using an adhesive. Then, an unnecessary exposed optical fiber protruding from a connection end surface 14 of the ferrule main body 11 is cut off and then the connection end surface 14 of the ferrule is polished up into a spherical configuration including the fiber.

An outer periphery of the main body 11 is composed of a fitting portion 16 located at a forward end portion thereof and fitted with an inner-peripheral surface of a connection sleeve as later described and an outer-peripheral portion 16' preceding a flange portion 15. On a rear end portion of the ferrule main body 11 there is mounted the flange portion 15.

In order to ensure that dust attaching for various reasons onto the surface of the fitting portion 16 does not obstruct smooth interfitting between the fitting portion 16 and the connection sleeve, a plurality of annular grooves 17 are formed in a surface 16A of the fitting portion 16. In the illustrated example, the three annular grooves 17 are provided at axial intervals. And, it is arranged that when the fitting portion 16 of the ferrule 1 is slid within the connection sleeve and thereby inserted thereinto and the mating ferrules are caused to oppose each other, the dust having attached onto the surface 16A of the fitting portion 16 is caused to drop into the annular grooves 17.

Figure 2:
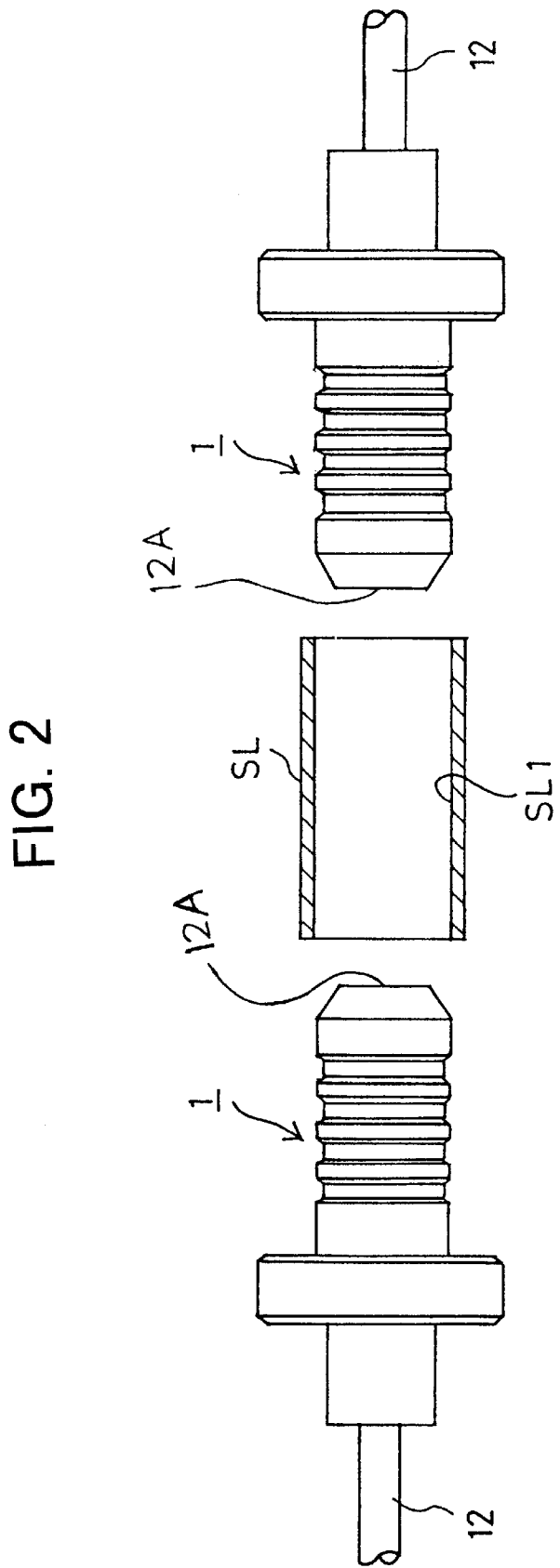
FIG. 2 is a view illustrating the way in which optical fibers are directly connected to each other by using the ferrules illustrated in FIG. 1.

FIG. 2 illustrates the way in which two ferrules each having the construction illustrated in FIG. 1 are connected to each other by using the connection sleeve SL. Ordinarily, the connection sleeve SL is of a structure (not illustrated) formed with a fine split in the axial direction. The inside diameter of an inner-peripheral surface SL1 is finished up into a dimension slightly smaller than the outside diameter of the surface 16A of the fitting portion 16, whereby the ferrule 1 is inserted through the sleeve SL by utilizing the elastic effect of the sleeve of the present invention. Accordingly, when the ferrule 1 is fitted into the connection sleeve SL by forcing the inside diameter thereof to be spread, the surface 16A of each fitting portion 16 of the ferrule 1 is exactly interfitted with the inner-peripheral surface SL1 of the connection sleeve SL, whereby a connection end 12A of the optical fiber 12 of one ferrule 1 can be aligned with a connection end 12A of the optical fiber 12 of the other ferrule 1. With respect to connection made in FIG. 2, the following advantage is brought about because the plurality of annular grooves 17 are formed in the surface 16A of the fitting portion 16 of the ferrule 1. That is, even when dust suspended in the air has attached onto the surface 16A or waste having been produced due to the friction resulting from the attachments/detachments between the ferrule 1 and the connection sleeve SL has attached onto the surface 16A, these dust pieces are dropped into the annular grooves 17. This makes it possible to effectively prevent the dust pieces from being clamped between the surface 16A and the inner-peripheral surface SL. As a consequence, even if the two ferrules 1 are repeatedly connected together by means of the connection sleeve SL, it becomes possible to maintain a sufficiently high level of positional opposition precision and thereby make a low-loss connection.

Figure 3:
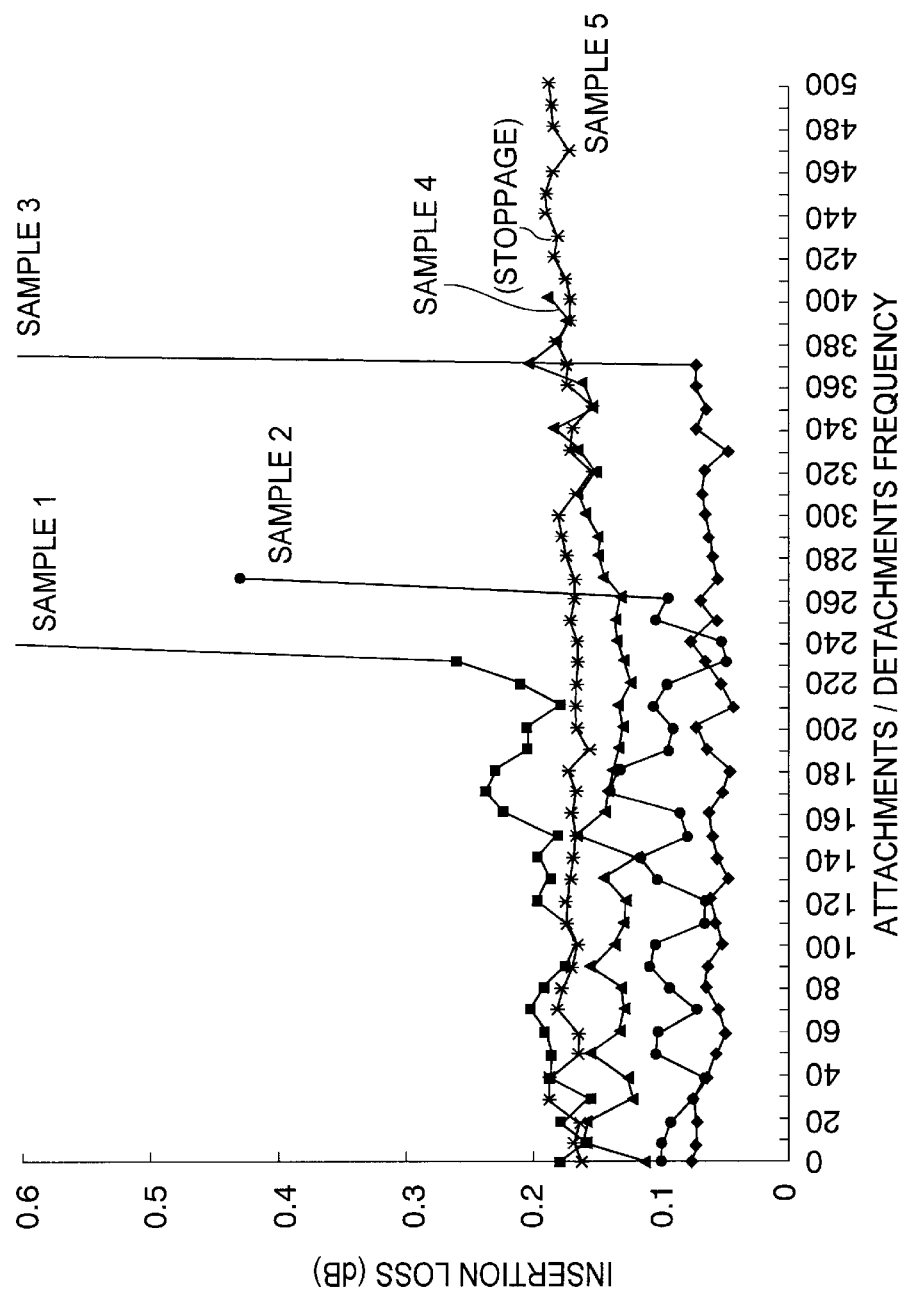
FIG. 3 is a graph illustrating the behavior of variation in the connection loss exhibited when direct connection of optical fibers is performed using the ferrule illustrated in FIG. 2.
Figure 10:
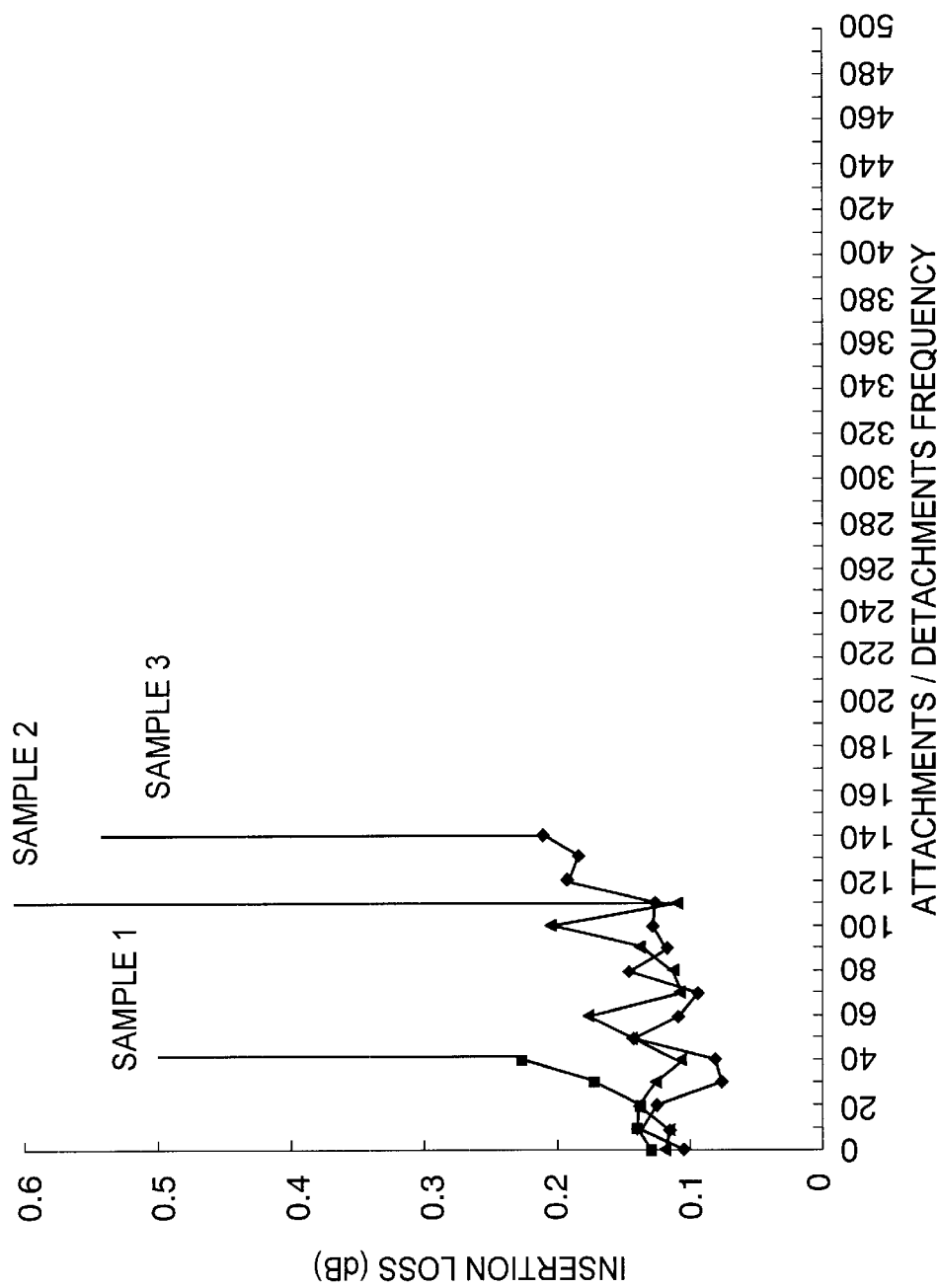
FIG. 10 is a graph illustrating the behavior of variation in the connection loss exhibited when repeated connection of the ferrules illustrated in FIG. 9 is connected.

FIG. 3 is a graph illustrating the relationship between the frequency of attachments/detachments and the insertion loss which is exhibited when the present invention has been applied to each sample of various ferrules. As is seen from the graph regarding the attachment/detachment test with no cleaning being done, illustrated in FIG. 3, by forming the grooves in the fitting surfaces of the ferrule main body, the insertion loss is made very stable even when the attachments/detachments are performed and so the insertion loss with respect to the frequency of attachments/detachments is largely improved compared to that in the conventional case illustrated in FIG. 10.

Figure 4:
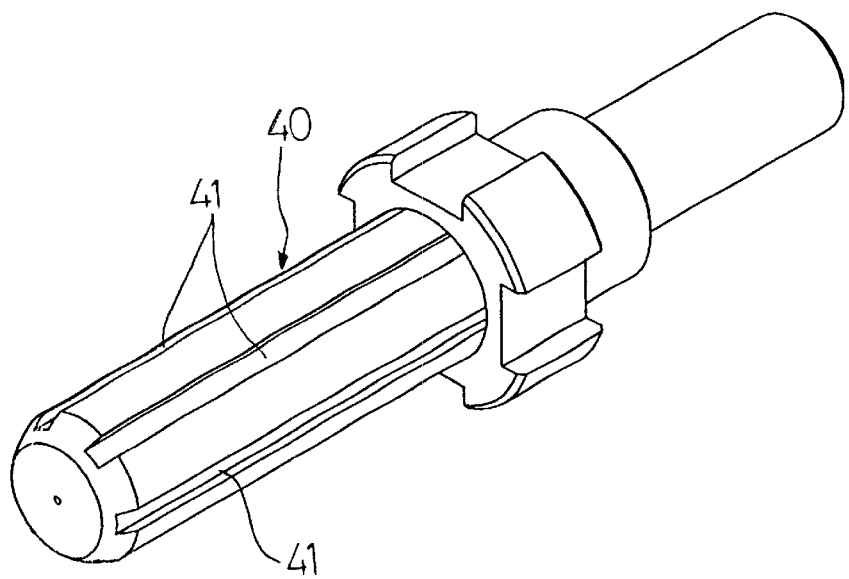
FIG. 4 is an appearance view illustrating an example of an embodiment of the ferrule.
Figure 5:
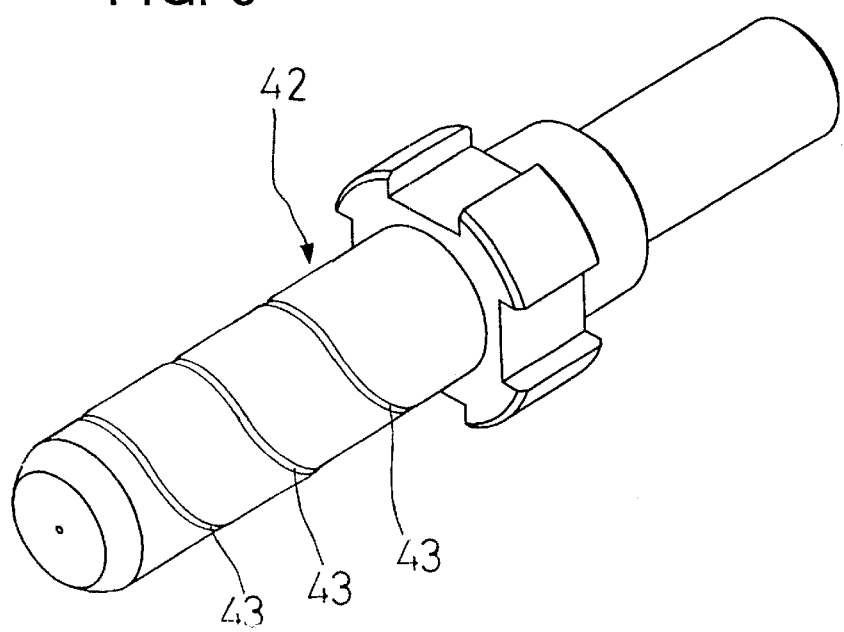
FIG. 5 is an appearance view illustrating an example of the embodiment of the ferrule.

FIG. 4 illustrates another example of the embodiment of FIG. 1. In this example, a plurality of grooves 41 extending in the axial direction of the ferrule 40 is formed instead of the annular grooves of FIG. 1. FIG. 5 illustrates still another example of the embodiment of FIG. 1. In this example, a spirally extending groove 43 is formed in the ferrule 42. As a result, the same advantage as that attainable with FIG. 1 can be obtained.

Figure 6:
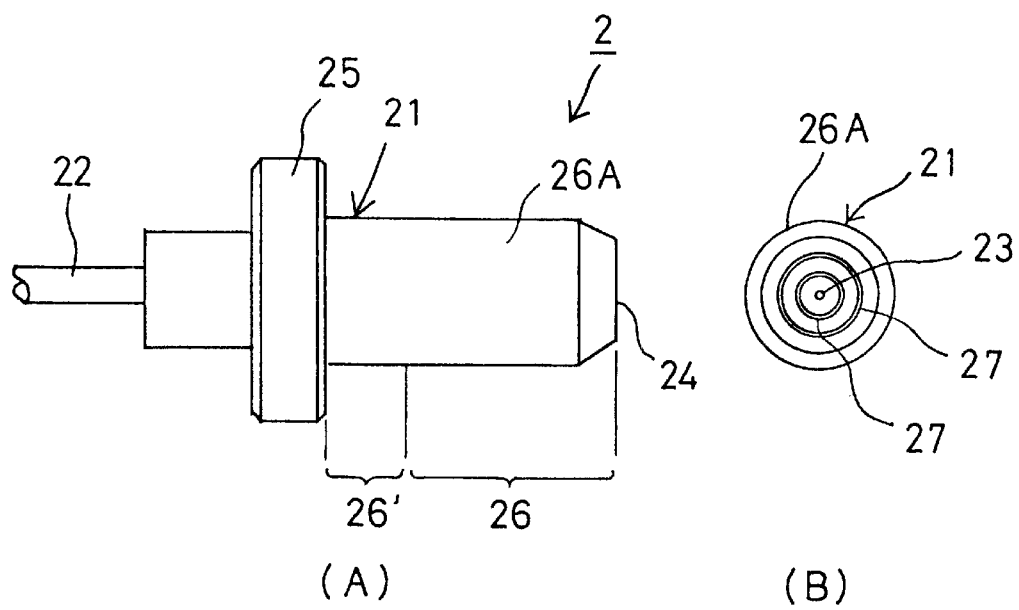
FIGS. 6(A) and 6(B) are a front view and right side view illustrating an example of an embodiment of the ferrule.

FIGS. 6(A) and 6(B) illustrate an example of another embodiment of the ferrule according to the present invention. FIG. 6(A) is a front view thereof and FIG. 6(B) is a right side view thereof. A ferrule 2 for use in an optical connector illustrated in FIG. 6, also, has a circular-columnar ferrule main body 21 formed using material such as metal or zirconia. The ferrule main body 21 has formed therein an insertion hole for permitting insertion therethrough of a buffered optical fiber 22 whose forward end is exposed in such a way that the insertion hole passes through the ferrule main body 21 at the center axis thereof. The exposed optical fiber inserted in the insertion hole 13 provided at the end portion of the ferrule main body is fixed therein by using an adhesive. Then, an unnecessary optical fiber protruding from a connection end surface 24 of the ferrule main body 21 is cut off and then the connection end surface 24 of the ferrule is polished up into a spherical connection end with annular grooves 27 as later described being left as are.

A flange 25 is mounted on a rear end of the ferrule main body 21. A portion between the connection end surface 24 and the flange 25 is composed of a fitting portion 26 to be interfitted with an inner-peripheral surface of the connection sleeve and an outer-peripheral portion 26' not to be interfitted therewith.

Although no groove is formed in the surface 26A of the fitting portion 26 of the ferrule 2, in order that dust attaching for various reasons onto the surface of the connection end surface 24 does not obstruct close contact between the two ferrules when this connection end surface 24 opposes the connection end surface 24 of the opponent ferrule and is closely contacted thereto, a plurality of annular grooves 27 are formed in the connection end surface 24. In the illustrated example, the two annular grooves 27 are formed concentrically about an insertion hole 23.

Accordingly, when the two ferrule main bodies 21 are connected to each other within the connection sleeve SL, the annular grooves 27 allow the dust having attached onto the connection end surface 24 to be dropped thereinto, thereby serving to achieve good contact between the mating connection end surfaces 24. This enables the effective suppression of the increase in the insertion loss even when the attachments/detachments of the ferrules are repeatedly performed and this enables a low-loss optical fiber connection, as in the case of the previous construction.

Figure 7:
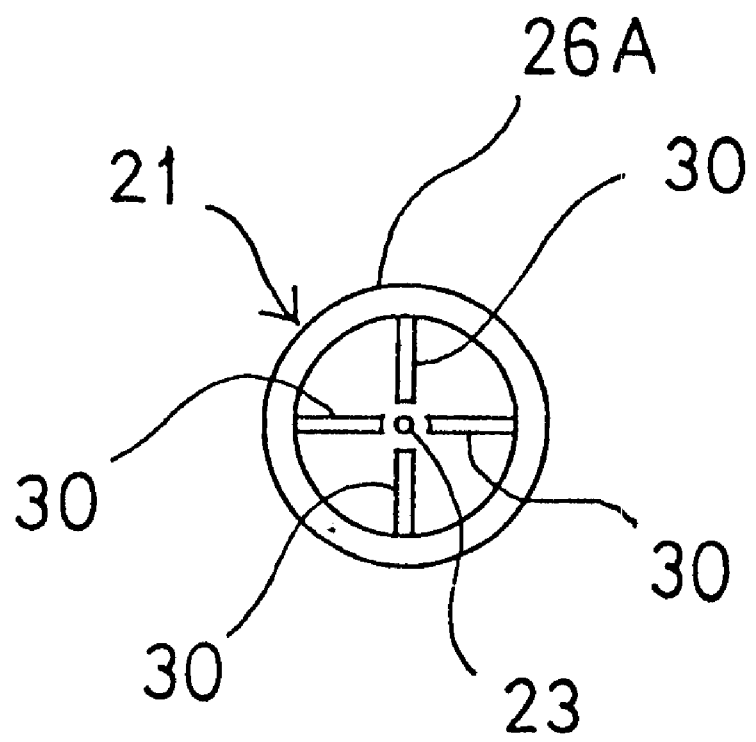
FIG. 7 is an appearance view illustrating an example of the embodiment of the ferrule.
Figure 8:
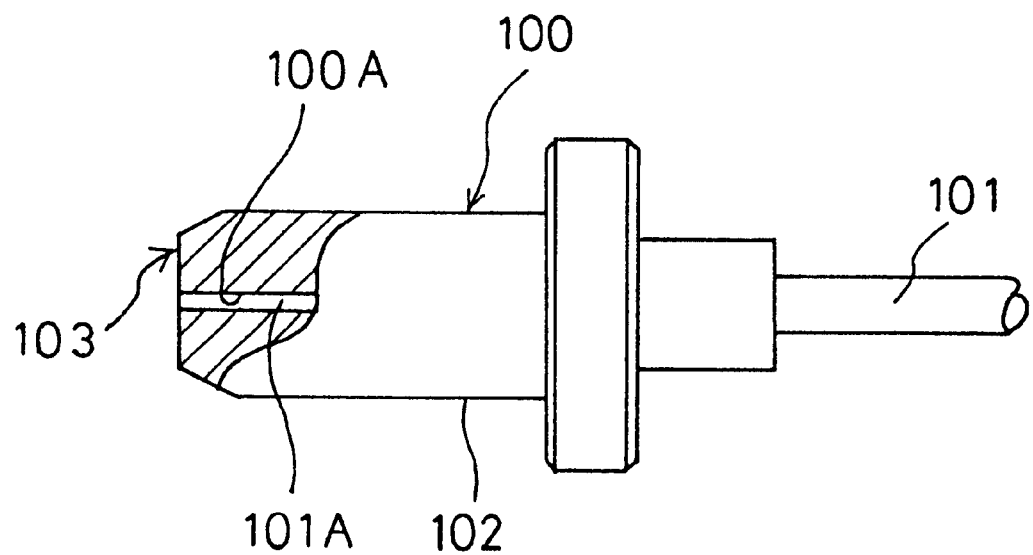
FIG. 8 is a sectional view illustrating the structure of a conventional ferrule.
Figure 9:
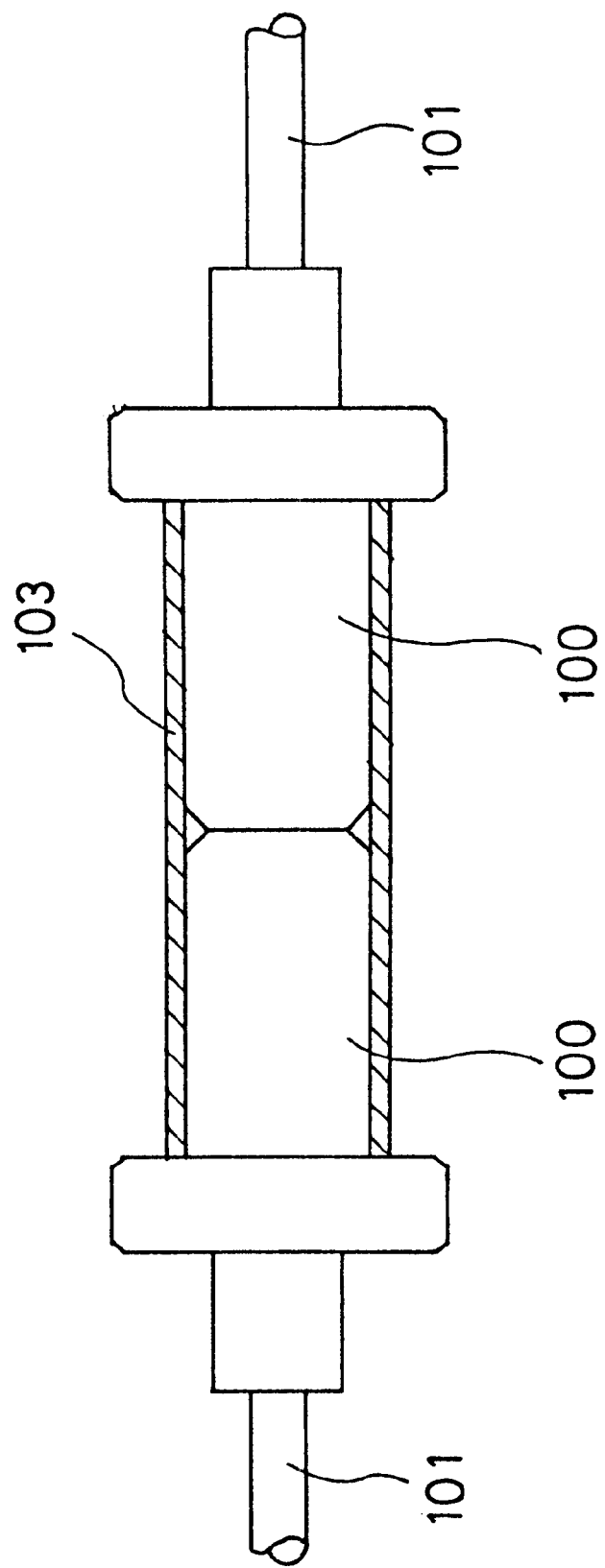
FIG. 9. is a view illustrating the way in which the conventional ferrules illustrated in FIG. 8 are connected to each other.

FIG. 7 illustrates another example of the above-mentioned another embodiment. In this example, radially extending grooves 30 are formed instead of the annular grooves of FIG. 6. As a result, the same advantage as that attainable with FIG. 6 can be obtained.

Incidentally, although here in each of the above-mentioned embodiments metal, zirconia or zirconia ceramic has been used as the material of the ferrule, the same advantage as that attainable with the use thereof of can of course be obtained also with ferrules each made of other ceramic, plastic, glass or the like. Also, although the sleeve axially formed with a split has been explained as the sleeve for use in the present invention, even when there is used a precision circular-cylindrical sleeve formed with no split and having an inside diameter dimension slightly larger than the outside diameter of the ferrule, the same advantage is obtained. Further, it is considered to be also effective to simultaneously form the grooves in the both of the outer surface and forward end surface of the ferrule. Also, although here in each of the above-mentioned embodiments the fiber is fixed to inside the ferrule by using an adhesive and thereafter the end surface is finished up into a spherical configuration, the present invention is also effective for the method wherein the end surface of the ferrule as a single unit is already finished up into a convex-spherical surface and the outer-peripheral surface or end surface thereof is formed with the grooves beforehand and thereafter the fiber is inserted and fixed and polished up.

Industrial Utilizability

According to the present invention, as mentioned above, the plurality of grooves are formed in the surface of the fitting portion of the ferrule main body. Therefore, even when dust or waste has attached onto this surface, at the time of fitting the ferrule into the connection sleeve the dust or waste having attached onto the surface is dropped into the grooves, whereby it is possible to effectively prevent the dust or waste pieces from being clamped between the surface and the inner-peripheral surface. As a result, even when the ferrules are repeatedly connected together by the connection sleeve, low-loss connection becomes possible.

Also, in the case where the grooves are provided in the connection end of the ferrule main body, the dust or waste having attached onto the connection end surface is caused to drop into these grooves at the time when the ferrules oppose each other and so these grooves serve to achieve a good close contact between the mating connection end surfaces. This enables the effective suppression of the increase in the insertion loss even when the attachments/detachments of the ferrules are repeatedly performed and this enables a low-loss optical fiber connection,

What is claimed is:

1. A ferrule for use in an optical connector, comprising: a ferrule body having an outer peripheral surface slidably insertable when in use into a connection sleeve, a front end of the outer peripheral surface terminating in a front end face which abuts another optical component when the ferrule is inserted into a connection sleeve, and having a slot extending axially through the ferrule body for receiving an optical fiber when in use, the optical fiber terminating at the front end face of the outer peripheral surface; wherein at least one annular groove is formed in the front end face of the ferrule body spaced apart from the slot.

2. A ferrule for use in an optical connector according to claim 1; wherein the ferrule body has a circular cross section.

3. A ferrule for use in an optical connector according to claim 1; wherein the ferrule body is formed of one of a metallic material and a ceramic material.

4. A ferrule for use in an optical connector according to claim 1; wherein the ferrule body is formed of zirconia.

5. A ferrule for use in an optical connector according to claim 1; wherein the at least one annular groove comprises a plurality of concentric annular grooves.

6. A ferrule for use in an optical connector, comprising: a ferrule body having an outer peripheral surface slidably engageable when in use into a connection sleeve, a front end of the outer peripheral surface terminating in a front end face which abuts another optical component when the ferrule is inserted into a connection sleeve, and having a slot extending axially through the ferrule body for receiving an optical fiber when in use, the optical fiber terminating at the front end face of the outer peripheral surface; wherein at least one radially extending radial groove is formed in the front end face of the ferrule body spaced apart from the slot.

7. A ferrule for use in an optical connector according to claim 6; wherein the ferrule body has a circular cross section.

8. A ferrule for use in an optical connector according to claim 6; wherein the ferrule body is formed of one of a metallic material and a ceramic material.

9. A ferrule for use in an optical connector according to claim 6; wherein the ferrule body is formed of zirconia.

10. A ferrule for use in an optical connector, comprising: a ferrule body having an outer peripheral surface slidably engageable when in use into a connection sleeve and having a slot extending axially therethrough for receiving an optical fiber when in use, the slot terminating at a forward end face of the ferrule body; wherein the forward end face of the ferrule body has a pattern formed therein spaced from the slot which prevents particulate matter on the peripheral surface of the ferrule or on an inner surface of a connection sleeve from impeding the creation of a repeatable low loss interconnection between the ferrule and a connection sleeve by permitting particulate matter to fall outside areas in which an outer peripheral surface of the ferrule and the inner surface of the connecting sleeve come into contact.

11. A ferrule for use in an optical connector according to claim 10; wherein the ferrule body has a circular cross section.

12. A ferrule for use in an optical connector according to claim 10; wherein the ferrule body is formed of one of a metallic material and a ceramic material.

13. A ferrule for use in an optical connector according to claim 10; wherein the ferrule body is formed of zirconia.

14. A ferrule for use in an optical connector according to claim 10; wherein an outer diameter of the ferrule body is formed slightly larger than an inner diameter of a connection sleeve into which the ferrule is to be inserted, so that the ferrule is held in the connection sleeve by an elastic force imparted by the connection sleeve.

* * * * *